2,842,423

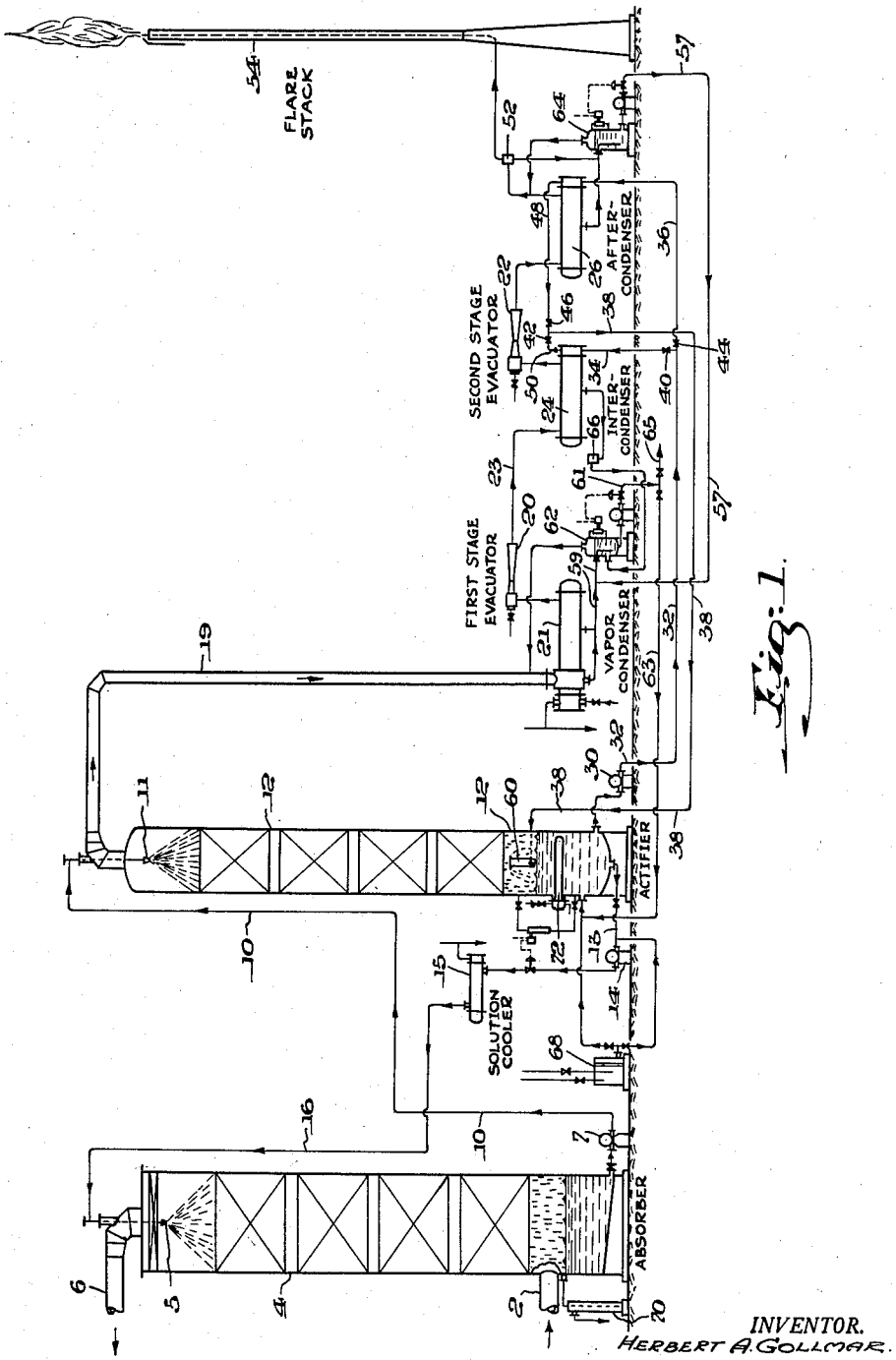

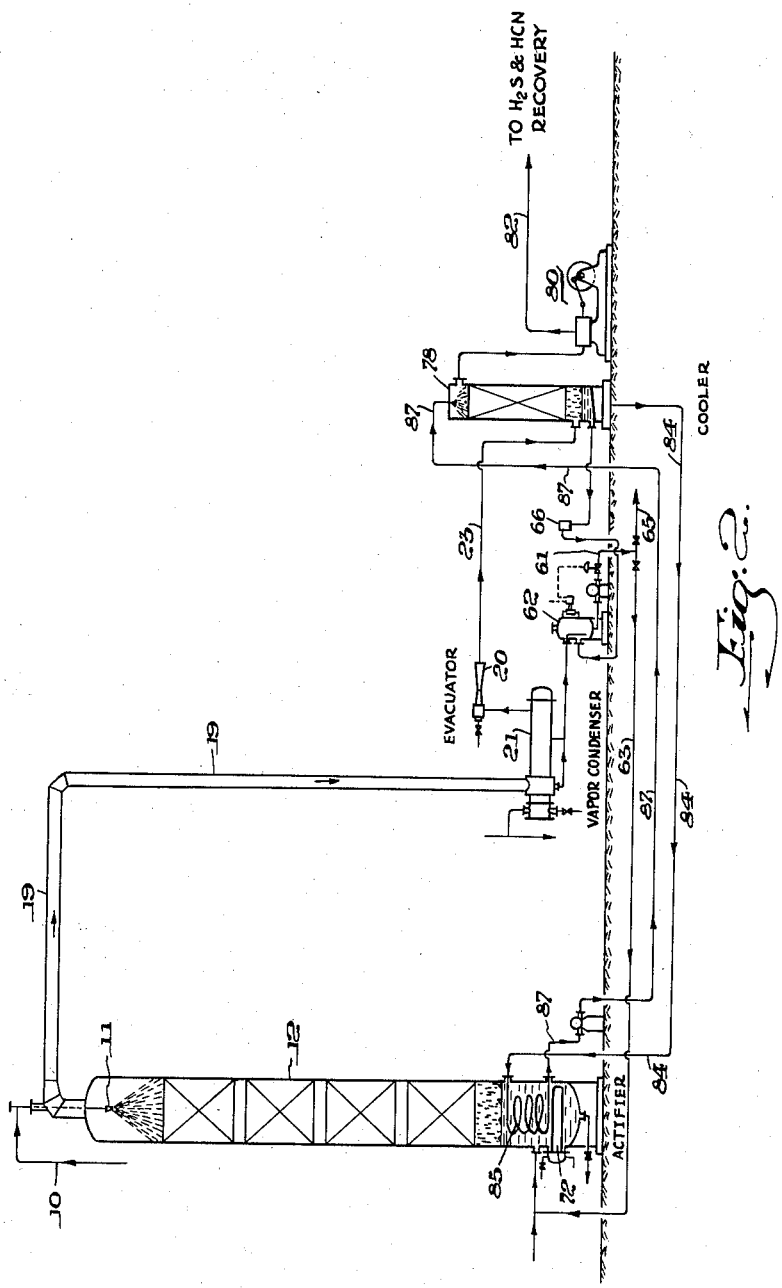

SEPARATION OF ACID GASES FROM COAL CARBONIZATION GASES

Herbert A. Gollmar, Pittsburgh, Pa.

Application April 13, 1955, Serial No. 501,160

8 Claims. (Cl. 23—3)

This invention relates to the separation of acid gases, such as hydrogen sulfide, hydrogen cyanide and carbon dioxide from gases containing them, for example, coal-carbonization gases, and in effect is an improvement of the invention presented in U. S. patent application Ser. No. 470,450, filed November 22, 1954. One well-known method for separation of acidic vapors from gases, particularly those that may still also contain small amounts of ammonia is the hot-vacuum-actification process. The hot-vacuum-actification process of separating acid gases from, for example, coke oven gases, comprises broadly—absorbing the acid gases such as $H_2S$, HCN and $CO_2$ in an alkali metal carbonate solution in a scrubber, then heating the alkaline solution under a high vacuum in an actifier to drive the acid gases out of the absorption solution. At the same time the absorption solution is regenerated so that the solution may be returned to the scrubber in a closed cycle. This hot-vacuum-actification process is described in detail in the patent to Sperr 1,533,773, issued April 14, 1925.

An alkaline metal carbonate solution generally is employed to absorb the acid gases from the gas, and when the fouled solution is heated under a vacuum to remove the acid gases a very large volume of water vapor is formed so that it is necessary to separate the water vapor from the acid gas before the acid gases can be further separated and refined. Since an alkaline metal carbonate solution normally is employed to absorb the acid gases from the fuel gas, the process has become known as the "vacuum carbonate process."

In that part of the process wherein water vapor is separated from the acidic gases, three problems are encountered: first, the vacuum pump plugs up apparently due to polymer formation; second, small amounts of ammonia contaminate the separated gases; and third, high melting-point hydrocarbons, such as naphthalene and phenanthrene clog up condenser lines. Although the concentration of the ammonia and high melting-point hydrocarbons in the vapors leaving the actifier may be low, when the volume is reduced so greatly by the removal of water the concentration of these contaminants rapidly builds up in the residual acidic gases. The high melting-point-compounds precipitate in the tubes and parts of the condensers and ammonia-promoted polymer compounds act to clog piping and vapor passages that convey acid gases in the vacuum pump. It is important, therefore, that these contaminants be removed in order to permit an efficient separation of the water vapor from the acidic gases.

A disadvantage of the vacuum carbonate process, therefore, was that equipment used in refining the acidic gases was frequently rendered inoperative by contaminating compounds such as naphthalene and phenanthrene which clogged condensers, valves and orifices. In addition, ammonia that was fortuitously either continuously or periodically present in the actifier vapors, caused polymerization of constituents of the vapors to give reaction products that deposited in the vacuum pumps and thus led to obstruction of their vapor passageways. The problem of clogged condenser tubes, valves and other orifices was solved and is the subject to U. S. Patent 2,671,008, issued March 2, 1954.

By the process of U. S. Patent 2,671,008 ingredients which caused clogging of condenser tubes, valves and other orifices were removed from the vapors by the use of a comparatively small amount of solvents, resulting in operation without clogging of passageways of condensers and the like, and some improvement in vacuum pump operation because of removal of ammonia before the gas passed through the vacuum pump. However, while lines were clear from clogging by high melting-point hydrocarbons, the problem of vacuum pump stoppage was not completely solved. In commercial installations wherein the vacuum carbonate process is employed it has still been necessary to shut down periodically to clean out the pump. By the process set forth in patent application U. S. Serial No. 470,450, however, shutdowns for this purpose were substantially eliminated. The invention set forth in patent application U. S. Serial No. 470,450 was based on the discovery that polymerization occurs in the pump itself by virtue of heat generated when the acid gases, at the high vacuum that is necessary to release them from the absorption solution in the actifier, are compressed to the pressure required to propel them to the point of utilization. Accordingly, by the invention set forth in U. S. Serial No. 470,450, the pump compression ratio was reduced or pumps were eliminated. Steam jet evacuating means were provided to operate on vapors leaving the actifier.

Before the process of U. S. Patent 2,671,008 it was not practical to keep the hot-vacuum-actification plant operating at capacity because naphthalene would plug condensing equipment in less than one day's time. After employing the process of U. S. Patent 2,671,008 the hot-vacuum-actification plant could be operated at capacity in spite of naphthalene, phenanthrene and the like. However, the plant could not be operated continuously for periods longer than one or two months because of shutdowns that were necessary to remove polymer obstructions in and after the vacuum pump. Reducing the pump compression ratio or eliminating pumps as disclosed in U. S. Serial No. 470,450 resulted in improved physical conditions and continuous operation for ten months, and there was no indication that the plant would have to be shut down for polymer removal in the future.

While the problem of formation of hard polymers has been solved by the improvement of U. S. Serial No. 470,450, the solution is not entirely satisfactory because of the low efficiency of steam jet evacuators as compared with vacuum pumps. The considerable quantities of steam required for maintaining the pressure in the actification zone less than atmospheric, say under a high vacuum of 3 to 9 inches mercury absolute pressure represent a vital factor in the economy of the process.

In accordance with this invention the overall hot-vacuum-actification process is improved and the process set forth in application U. S. Serial No. 470,450 is made more economical by utilizing in the vacuum actification zone the heat present in fluids leaving one or more stages of jet evacuation. In addition, the removal of heat from fluids leaving jet evacuating means, essentially a steam-actifier vapor mixture, at the same time effects the desired cooling of this mixture.

Conveniently, the process of this invention, in one of its aspects, is carried out by injecting steam through jet evacuating means in communication with said actification zone to maintain said subatmospheric pressure and to produce a mixture of steam and actifier vapors; and by then liberating hydrogen sulfide from the absorbent in the actification zone by application thereto of heat of the steam-actifier vapor mixture.

According to another of its aspects at least one jet evacuating means is adapted to admit enough steam, to provide a pressure ratio sufficiently high so that the resulting steam-actifier vapors, when indirectly heat-exchanged with the actified absorbent solution, will heat the actified absorbent solution sufficiently to generate steam. The steam thus generated passes into direct contact with fouled absorbent liberating therefrom gases including hydrogen sulfide.

The various features of the invention are shown in the accompanying drawing which is illustrative only, and not limiting, in so far as the invention is concerned.

Figure 1 is a flow diagram of the hot-vacuum-actification process and the apaparatus employed in heating the actifier solution and condensing the actified vapors in accordance with one embodiment of the invention.

Figure 2 is a flow diagram of the hot-vacuum-actification process and the apparatus employed in heating the actifier solution and condensing the actified vapors in accordance with another embodiment of the invention.

Refering now to Figure 1, coke oven gas, which contains hydrogen sulfide, hydrogen cyanide, carbon dioxide and other constituents, is introduced into a scrubber 4 through an inlet pipe 2 and passes upwardly through the scrubber in counter-current circulation with an alkaline absorbing solution introduced into the top of the scrubber through a distributor 5. Preferably a mixture of sodium carbonate and sodium bicarbonate is used for absorbing the acid gases from the coke oven gas. The scrubbed coke oven gas leaves the top of the scrubber through an outlet 6. Fouled alkaline absorption liquid is drawn off from the bottom of the scrubber 4 by a pump 7 and is forced through a line 10 into a distributor 11 located in the top of an actifying tower 12.

In the actifying tower 12 the fouled liquor is heated, in accordance with the invention, under a high vacuum of approximately 4 inches of mercury absolute pressure to drive off the constituents absorbed in the alkaline liquor in the scrubber. The alkaline liquor flows downwardly through the actifier 12 and is met with water vapors generated from the alkaline solution by heat applied to the solution in accordance with this invention as will be subsequently described. Revivified alkaline solution accumulates in the bottom of the actifier and is dawn off through a line 13 to a pump 14 and is then returned, after being cooled in cooler 15, through a line 16 into distributor 5 in scrubber 4. Thus the alkaline absorption solution is circulated in a closed cycle between the scrubber and the actifier in which the absorption solution is revivified.

Since the vacuum of about 4 inches mercury pressure absolute was readily maintained by vacuum pumps, there was no apparent reason for modifying the pumping system. In accordance with Serial No. 470,450, however, steam jet evacuating means were provided either alone or in series with the vacuum pump to operate on vapors leaving the actifier, thereby overcoming difficulties due to hard polymer formation. When HCN is not recovered, the vacuum pump generally will be eliminated. In this instance the required substantial vacuum is maintained in the actifier and condenser by the use of steam jet evacuators in one or more stages, depending upon the pressure ratio in each stage, adapted for heat recovery. Normally, to reduce the pressure from atmospheric to 4 inches mercury absolute, two stages comprising jet evacuators 20 and 22 and condensers 24 and 26 are employed. Actifier vapors from condenser 21 are mixed with operating steam in jet evacuator 20 while actifier vapors from condenser 24 are mixed with operating steam in jet evacuator 22.

As indicated, heat used in liberating hydrogen sulfide from the absorbent is derived from the steam-actifier vapor mixture leaving jet evacuating means. As shown in Figure 1, steam-actifier vapors from jet evacuator 20 are withdrawn to intercondenser 24 while steam-actifier vapors from jet evacuator 22 are withdrawn to aftercondenser 26 to supply the heat to produce water vapor in the actifier.

Actified solution is withdrawn from the base of actifier 12 by means of pump 30, and in parallel or in series, is passed in indirect heat-exchange with the steam-actifier vapor mixture from the two steam jet evacuators, heating the actified solution and cooling the steam-actifier vapor mixture in the intercondenser and in the aftercondenser. In the embodiment of Figure 1 parallel flow is shown, the actified solution being conducted through lines 32 and 34 to intercondenser 24 and through lines 32 and 36 to aftercondenser 26. In condensers 24 and 26 the steam-actifier vapors are passed into indirect contact with fouled solution, heating the fouled solution to generate steam. This heated fluid is returned to actifier 12 through line 38, the generated steam passing into direct contact with sprayed fouled solution in the upper actification zone liberating therefrom gases including hydrogen sulfide. Valves 40 and 42, as well as 44 and 46, are adjusted to control the rate of flow of actifier solution through exchanger-condensers 24 and 26 for maximum rise in temperature of the absorbent.

As indicated, one jet evacuating means can be used. Nevertheless it will be more desirable to employ a plurality of jet evacuating means. In this instance, however, it will be necessary to admit sufficient steam through at least one jet evacuating means and provide a pressure ratio sufficiently high so that the resulting steam actifier vapors will supply sufficient heat to the fouled solution to generate the steam necessary for hydrogen sulfide stripping. According to one desirable method the first jet evacuator will be so operated and hence will be larger than the second jet evacuator. By this method the vapors entering the second jet evacuator from a larger first evacuator will be at a higher temperature than those from vapor condenser 21, and if desired, valves 44 and 46 can be controlled so the temperatures in lines 50 and 48 will be equal.

In one instance of customary modern practice, coke oven gas enters line 2 at about 80° F. and is countercurrently contacted in absorber 4 by actified absorbent from the bottom of actifier 12. Since it is desired to have the temperature of the scrubbing solution approximately equal to that of the incoming gas, that is about 80° F., a solution cooler 15 is provided to cool the actified absorbent which is at a temperature of 127° F. at 4.2 inches Hg absolute in the bottom of actifier 12.

Fouled absorbent from absorber 4 is conducted to the top of actifier 12 through line 10 by pump 7. To maintain the actifier under a vacuum of 4.2 inches Hg absolute, steam jet evacuators 20 and 22 are employed. Vapors from actifier 12 leave the top of the actifier through line 19 and pass to a vapor condenser 21 at a temperature of 120° F. and 3.5 inches Hg absolute. This vapor condenser is inserted between the first stage jet evacuator 20 and the actifier because the actifier overhead contains large quantities of water vapor, for example, 10 mols of vapor to 1 mol of fixed gases. If this water vapor is not first condensed, say to 1 mol vapor to 1 mol of fixed gases, in vapor condenser 21, the amount of steam required in first stage jet evacuator 20 would be greater than that needed in heating the actifier solution. In vapor condenser 21 the overhead gases are cooled from 120° F. at 3.5 inches Hg absolute to 100° F. at 3.4 inches Hg absolute.

Steam is injected into the first stage jet evacuator 20 at about 150 lbs. gauge and the steam-actifier vapor mixture leaving the jet in line 23 enters intercondenser 60 at 175° F. and 15.0 inches Hg absolute. It is seen that the pressure increase across the first stage jet evacuator is from 3 inches Hg to 15 inches Hg. In intercondenser 24 the steam-actifier vapor mixture is cooled from 175° F. at 15.0 inches Hg to 155° F. at 14.8 inches Hg.

From intercondenser 24 vapors pass to second stage jet evacuator 22 at a temperature of 155° F. at 14.8 inches Hg absolute. The temperature of the steam-actifier vapor mixture flowing from second stage jet evacuator 22 to aftercondenser 26 is 216° F. at 34 inches Hg absolute. In aftercondenser 26 the steam-actifier vapor mixture is cooled from 216° F. at 34 inches Hg to 160° F. at 33.5 inches Hg. The $H_2S$—HCN mixture is then passed from aftercondenser 26 through a moisture eliminator 52 to flare stack 54.

As previously set forth, in accordance with this invention, the hydrogen sulfide-containing gas is liberated from the fouled absorbent in the actification zone by application thereto of heat of the steam-actifier vapor mixture. Thus the temperature of the actified absorbent in the bottom of actifier 12 is 127° F. while the temperature of intercondenser 24 is 175° F. and in aftercondenser 26 is 210° F. To supply the heat required in the actifier, actifier bottoms at 127° F. are withdrawn through line 32. A portion of the actifier solution, through line 40, is passed in indirect heat-exchange with steam-actifier vapors in intercondenser 24, while another portion, through line 36, is passed in indirect heat-exchange with steam-actifier vapors in aftercondenser 26. Both portions are heated from 127° F. to 152° F. and at this temperature are returned to the actifier through line 38. In order to prevent flashing of the 152° F. solution in lines 38, 50 and 48, a trough 60 is provided within actifier 12 extending above the liquid level in the actifier. The trough extends the length of the diameter of the actifier column and is deep enough to provide a head pressure sufficient to keep the actifier solution in line 38 in the liquid state until it is returned to the trough. Thus the 152° F. actifier solution is returned to the base of the trough in the liquid state because of the pressure due to the height of solution in the trough. As the solution rises in the trough and the pressure decreases the hot solution flashes under the vacuum in the actifier. Inasmuch as both fixed gases and vapor are rising in the column and since the temperature of the fouled absorbent entering the top of the column is 80° F. reflux reduces the load on vapor condenser 21.

Means 62 and 64 are provided for recovering condensate from condensers 21, 24 and 26. Since condensate enters tank 62 from both vapor condenser 21 and intercondenser 24, low pressure steam trap 66 is provided, because vapor condenser 21 is under 3 inches mercury pressure while intercondenser 24 is under about 15 inches mercury pressure. From vessel 62 condensate is withdrawn through line 61, and through line 63 is recirculated to actifier 12, or if HCN content is low the condensate can be discarded through line 65. Condensate from vessel 64 desirably can be recirculated to vessel 62 through lines 57 and 59, part being removed from the system through line 65 and part being recirculated through 61 and 63 to the actifier.

When necessary, fresh alkaline aqueous absorbing solution is added at 68 and in addition, overflow means 70 are provided to maintain a fixed liquid level in absorber 4.

In embodiment shown in Figure 1 actifier solution is withdrawn from the base of the actifier heat-exchanger with steam-actifier vapors and returned to the base of the actifier, circulating in a closed circuit. In the embodiment shown in Figure 2, however, the steam-actifier vapor condensate passes through line 84 to an indirect heat-exchanger 85 disposed in the actifier solution within the actifier and is returned through line 87 to heat-exchange means 78. The actifier solution is then flashed directly and a trough is unnecessary. The arrangement of Figure 2 is especially useful when it is desired to recover HCN and avoid the formation of HCN polymers. When HCN is to be recovered it is desirable to use a vacuum pump 80 as shown in Figure 2 instead of the second jet evacuator. Vapors leaving the vacuum pump through line 82 can then be delivered into a subsequent condenser and into refining equipment for separating the constituents. The HCN is preferably dissolved in a large volume of cold water to be separated from the $H_2S$ and $CO_2$; the HCN can then be concentrated and separated from the water by distillation.

When HCN is recovered it is also generally desirable first to remove $NH_3$. This normally has been done by inserting an ammonia scrubber after the first stage steam jet evacuator, the steam and gases leaving the jet being passed through the scrubber counter-currently to a stream of water. The arrangement of Figure 2 is particularly advantageous since scrubber 78 is already in the circuit, being used for heating condensate which passes in indirect heat-exchange with actifier solution in the bottom of the actifier. Scrubber 78, by being slightly modified, therefore, serves two purposes. By adding a slightly additional quantity of water and controlling the amount of water withdrawn scrubber 78 can be used for ammonia removal as well as for recovering heat to be used to heat the actifier, the volume of water being controlled to absorb sufficient ammonia to prevent resinification of the acid gases in further treatment for the recovery of hydrogen cyanide.

It has been shown that there are various embodiments or ramifications of this invention. The described examples, therefore, are intended to be illustrative only, since other modifications will occur to those skilled in the art. Such modifications, of course, are within the contemplation of this invention. Thus, for example, the process may be modified slightly, depending upon the incoming temperature of the coke oven gas which is from 20° C. to 60° C. In another embodiment a supplementary indirect steam heat-exchanger 72 can be disposed in the actifier solution at the bottom of the actifier. The actifier can consequently be operated entirely from heat supplied by the intercondenser and the aftercondenser or the process can be operated so that only part of the heat is derived from the condensers with supplemental heat being applied by steam through steam coils. In still another modification, if oil or kerosene is injected in accordance with U. S. Patent 2,671,008 separators will be provided after the condensers for separating condensed oil from condensed water vapor.

It is seen that an economical process has been provided which accomplishes both maintaining the high vacuum in the actifier and heating the actified solution. The herein described invention can be employed to improve the efficiency of any process for liquid purification wherein the fouled liquid absorbent containing a constituent which has been scrubbed from a gas or extracted from a liquid is actifiable under subatmospheric pressure by heating. An example of a liquid purification process similar to the one described comprises the use of water to absorb ammonia and hydrogen cyanide from raw coke oven gas, the water containing the absorbed gases being thereafter actifiable by heating at subatmospheric pressure. Aqueous absorbents can be, for example, water or aqueous solutions of potassium, sodium, or other alkali metal carbonates and bicarbonates, solutions of alkali metal salts of other weak acids, or solutions of weak bases such as organic amines. The absorbable constituent in coke oven gas, or coal gas, can be hydrogen sulfide, hydrogen cyanide, carbon dioxide, ammonia, light oil, or carbon disulfide. Thus petroleum distillates, or light oil from coke oven effluent or other sources, can be purified in respect of removal of its hydrogen sulfide content by extraction of it with an alkaline aqueous solution which can thereafter be regenerated under vacuum by the low-temperature heat.

I claim:

1. A process for separation and recovery of hydrogen sulfide, and the like, from coal carbonization gas comprising: scrubbing the coal carbonization gas with an alkaline aqueous absorbent and absorbing hydrogen sulfide therefrom; removing fouled absorbent containing the dissolved hydrogen sulfide from the absorption zone and flowing this fouled absorbent through an actification zone under subatmospheric pressure; injecting steam through jet evacuating means in communication with said actification zone to maintain said subatmospheric pressure, whereby the tendency of the vapors from said actification zone to form hard polymers in the process equipment is substantially eliminated, producing within said evacuating means a mixture of steam and actifier vapors; circulating absorbent from the actification zone into indirect contact with said steam-actifier vapor mixture and by heat-exchange therewith heating the absorbent; circulating the absorbent thus heated back to the actification zone wherein vapors formed by the application of heat of said steam-actifier vapor mixture liberate hydrogen sulfide; and removing liberated hydrogen sulfide from the actification zone.

2. A process for separation and recovery of hydrogen sulfide, and the like, from coal carbonization gas comprising: scrubbing the coal carbonization gas with an alkaline aqueous absorbent and absorbing hydrogen sulfide therefrom; removing fouled absorbent containing the dissolved hydrogen sulfide from the absorption zone and flowing this fouled absorbent through an actification zone under subatmospheric pressure; injecting steam through jet evacuating means in communication with said actification zone to maintain said subatmospheric pressure and producing within said evacuating means a mixture of steam and actifier vapors, whereby the tendency of the vapors from said actification zone to form hard polymers in the process equipment is substantially eliminated, circulating the steam-actifier vapor mixture to the actification zone; passing the steam-actifier vapor mixture into indirect contact with absorbent in said actification zone and by heat-exchange heating the absorbent liberating hydrogen sulfide from absorbent in the actification zone by virtue of application thereto of heat of the steam-actifier vapor mixture; and removing liberated hydrogen sulfide from the actification zone.

3. In a continuous process wherein a gas containing acid gases is scrubbed with an aqueous solution of alkali metal carbonate and acid gases are absorbed thereby and dissolved in solution which then becomes a fouled absorbent and the fouled absorbent is thereafter actified by heating in an actification zone at subatmospheric pressure, the improvement comprising producing said subatmospheric pressure by steam jet evacuation, whereby the tendency of the vapors from said actification zone to form hard polymers in the process equipment is substantially eliminated, creating a mixture of steam and actifier vapors, bringing, in a closed cycle, actified absorbent from the actification and steam-actifier vapor, into indirect contact with each other, heating the actified absorbent sufficiently to generate steam, which passes into direct contact with fouled absorbent liberating the acid gases therefrom.

4. In a continuous process for the separation and recovery of hydrogen sulfide from coke oven gas, in which process coke oven gas is scrubbed with an aqueous solution of alkali metal carbonate and hydrogen sulfide is absorbed thereby and dissolved in solution, and in which the fouled absorbent is thereafter actified by heating in an actification zone at subatmospheric pressure, the improvement comprising: producing said subatmospheric pressure in a plurality of steam jet evacuation stages in series in communication with said actification zone, whereby the tendency of the vapors from said actification zone to form hard polymers in the process equipment is substantially eliminated, producing within each steam jet evacuation stage a mixture of steam and actifier vapors; circulating to the stages, in parallel and in a closed cycle, actified absorbent from the actification; passing the actified absorbent into indirect heat exchange with the steam-actifier vapor mixtures in each stage; adjusting the quantity of actified absorbent being heat-exchanged with steam-actifier vapor in each stage so that the resulting temperature of the fouled absorbent from all of the stages is the same after heat-exchange; returning the thus heated actified absorbent to the actification zone to liberate therefrom gases including hydrogen sulfide; removing liberated hydrogen sulfide from the actification zone; and passing a sufficient quantity of steam through the first stage steam jet evacuation stage to provide a pressure ratio sufficiently high so that indirect heat exchange of the resulting steam-actifier vapors with fouled absorbent will heat the actified absorbent to a temperature sufficient to generate steam, which passes into direct contact with fouled absorbent liberating the gases, including hydrogen sulfide, therefrom.

5. In a continuous process for the separation and recovery of hydrogen sulfide from coke oven gas, in which process coke oven gas is scrubbed with an aqueous solution of alkali metal carbonate and hydrogen sulfide is absorbed thereby and dissolved in solution, and in which the fouled absorbent is thereafter actified by heating in an actification zone at subatmospheric pressure, the improvement comprising: producing said subatmospheric pressure by steam jet evacuation resulting in a mixture of steam and actifier vapors, whereby the tendency of the vapors from said actification zone to form hard polymers in the process equipment is substantially eliminated; counter-currently flowing steam-actifier vapors in direct contact with water to condense the steam and simultaneously heat the water; and passing the mixture of condensed steam and simultaneously-heated water through the actification zone into indirect contact with actified absorbent in the actification zone to heat the actified solution.

6. The process of claim 5 wherein sufficient water is employed in the aforesaid direct contacting of the steam-actifier vapors therewith to absorb ammonia from the actifier vapors.

7. The process of claim 5 wherein sufficient steam is admitted through the jet evacuation and wherein the mixture of condensed steam and simultaneously-heated water is passed through the actification zone at a rate sufficient to generate steam, which passes into direct contact with fouled absorbent, liberating the gases, including hydrogen sulfide, therefrom.

8. In the recovery of acid gases from a fuel gas by a hot vacuum actification process comprising recirculating an aqueous alkaline absorbent solution in a closed cycle between a scrubber in which the fuel gas is scrubbed by the solution to remove acid gases and an actifier in which the acid gas-containing solution is actified and regenerated by heating at subatmospheric pressures, passing the vapors discharged from said actifier through condensing equipment in which said vapors are cooled, also passing said vapors through a vacuum pump, said vapors having a tendency to form hard polymers in said pump, providing steam jet evacuating means in series with said pump to operate on said vapors ahead of said pump, creating in the steam jet evacuating means a mixture of steam and actifier vapors, and controlling the temperature of the vapors leaving said pump to substantially eliminate the formation of said polymers in said pump, the improvement comprising bringing, in a closed cycle, into indirect contact with each other, the actified absorbent solution and the steam-actifier vapors, thereby heating the actified solution sufficiently to generate therefrom steam, which passes into direct contact with acid gas-containing solution in the actifier to liberate acid gases therefrom.

References Cited in the file of this patent

UNITED STATES PATENTS

| | | |
|---|---|---|
| 1,799,177 | Perry | Apr. 7, 1931 |
| 2,318,522 | Powell | May 4, 1943 |
| 2,368,600 | Rosenstein | Jan. 30, 1945 |
| 2,615,786 | Proell et al. | Oct. 28, 1952 |
| 2,632,597 | Boeckeler | Mar. 24, 1953 |

UNITED STATES PATENT OFFICE
CERTIFICATE OF CORRECTION

Patent No. 2,842,423                                  July 8, 1958

Herbert A. Gollmar

It is hereby certified that error appears in the printed specification of the above numbered patent requiring correction and that the said Letters Patent should read as corrected below.

Column 4, line 69, for "3.4 inches" read -- 3.0 inches --; column 5, line 62, for "heat-exchanger" read -- heat-exchanged --.

Signed and sealed this 9th day of September 1958.

(SEAL)
Attest:

KARL H. AXLINE                                         ROBERT C. WATSON
Attesting Officer                                       Commissioner of Patents